Figures 4, 5:
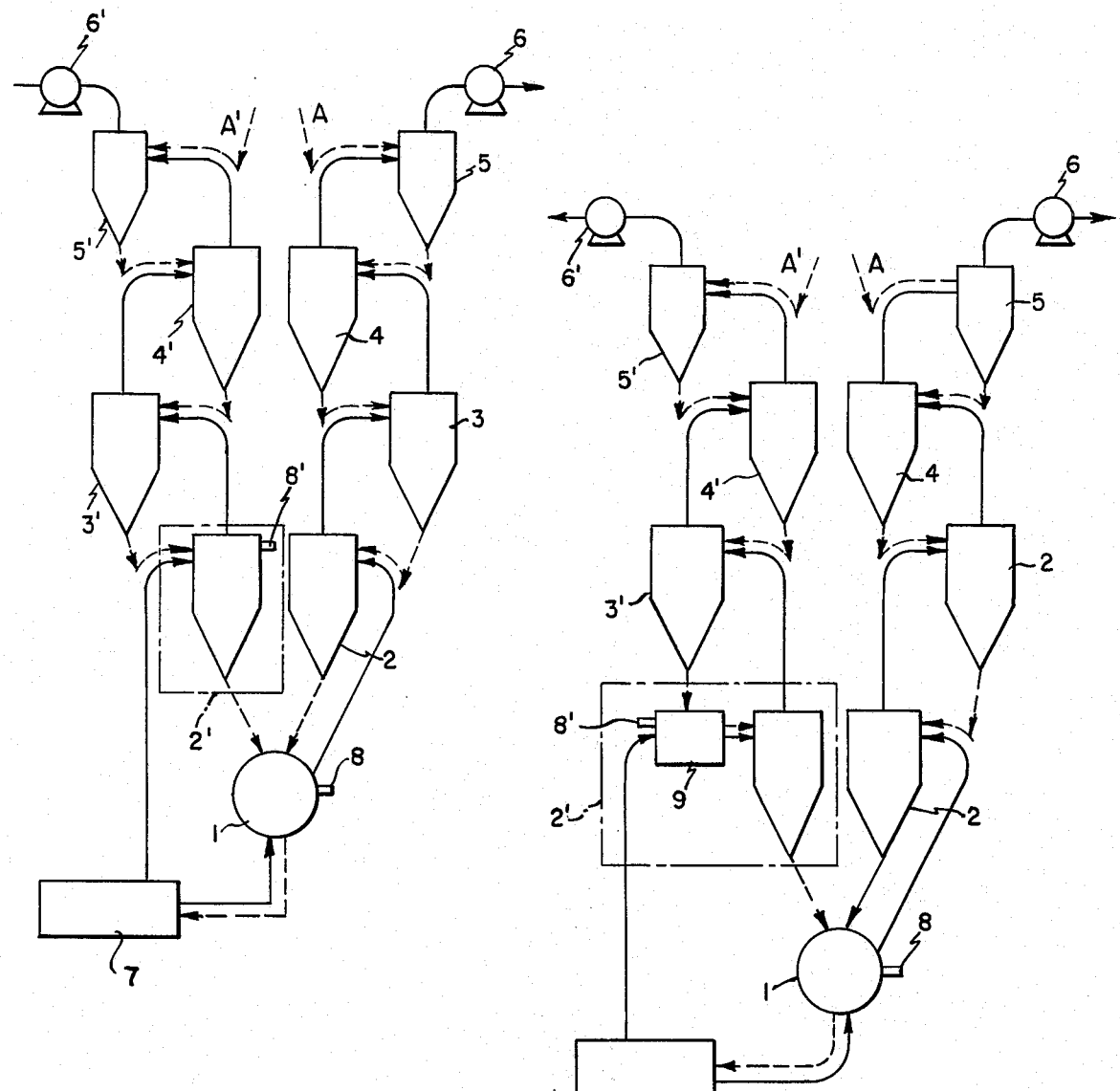

United States Patent [19]
Kano et al.

[11] 3,914,098
[45] Oct. 21, 1975

[54] SUSPENSION-TYPE PREHEATING SYSTEM FOR POWDERY RAW MATERIALS

[75] Inventors: Saburo Kano, Tokyo; Tatsuo Sasaki, Chiba; Toshihiro Kobayashi, Tokyo, all of Japan

[73] Assignee: Ishikawajima-Harima Jukogyo Kabushiki Kaisha, Ote, Japan

[22] Filed: Nov. 9, 1973

[21] Appl. No.: 414,249

[52] U.S. Cl. .................. 432/106; 34/57 R; 432/58
[51] Int. Cl.² ........................................... F27B 7/02
[58] Field of Search ............ 432/58, 15, 16, 4, 172, 432/106, 105, 82, 117, 129, 130, 133, 61; 34/10, 57 R

[56] References Cited
UNITED STATES PATENTS

| | | | |
|---|---|---|---|
| 3,146,998 | 9/1964 | Golüeke et al. | 432/16 |
| 3,319,349 | 5/1967 | Heinemann | 432/58 |
| 3,452,968 | 7/1969 | Shimizu et al. | 432/58 |
| 3,653,644 | 4/1972 | Polysius et al. | 34/57 R |
| 3,664,650 | 5/1972 | Weber et al. | 432/58 |
| 3,723,597 | 3/1973 | Dambrine et al. | 432/61 |
| 3,732,064 | 5/1973 | Jaquay | 432/61 |
| 3,869,248 | 3/1975 | Hirai et al. | 432/58 |

Primary Examiner—John J. Camby
Assistant Examiner—Henry C. Yuen

[57] ABSTRACT

A suspension-type preheating device for powdery raw materials of which device comprises a preheating-with-exhaust-gas system where as a medium for preheating the raw materials is used only hot exaust gas from a burning furnace and a preheating-with-combustion-gas device where only combustion gas independently generated is used as the medium and the device is so arranged that the material streams having passed through the respective preheating devices are combined and finally pass through the last heat transfer stages of the respective devices in series.

2 Claims, 9 Drawing Figures

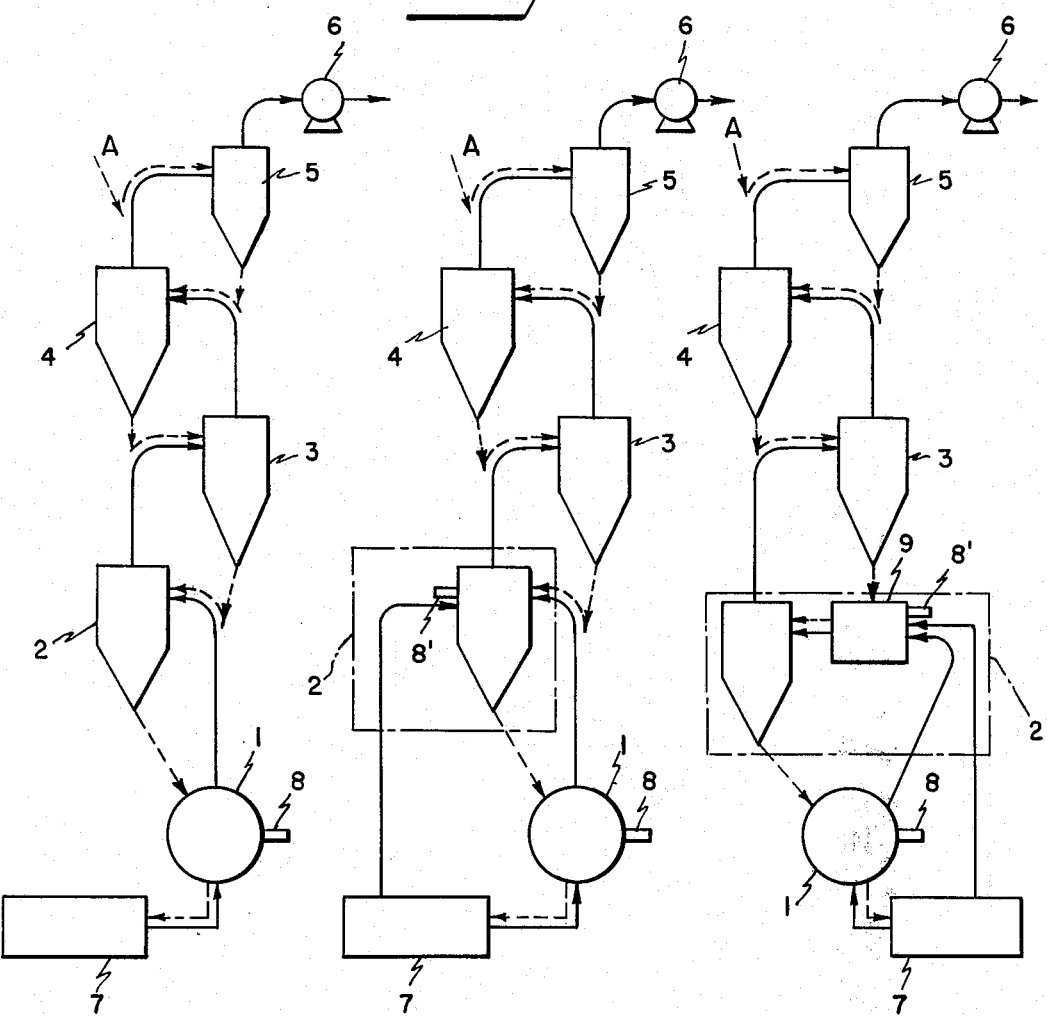

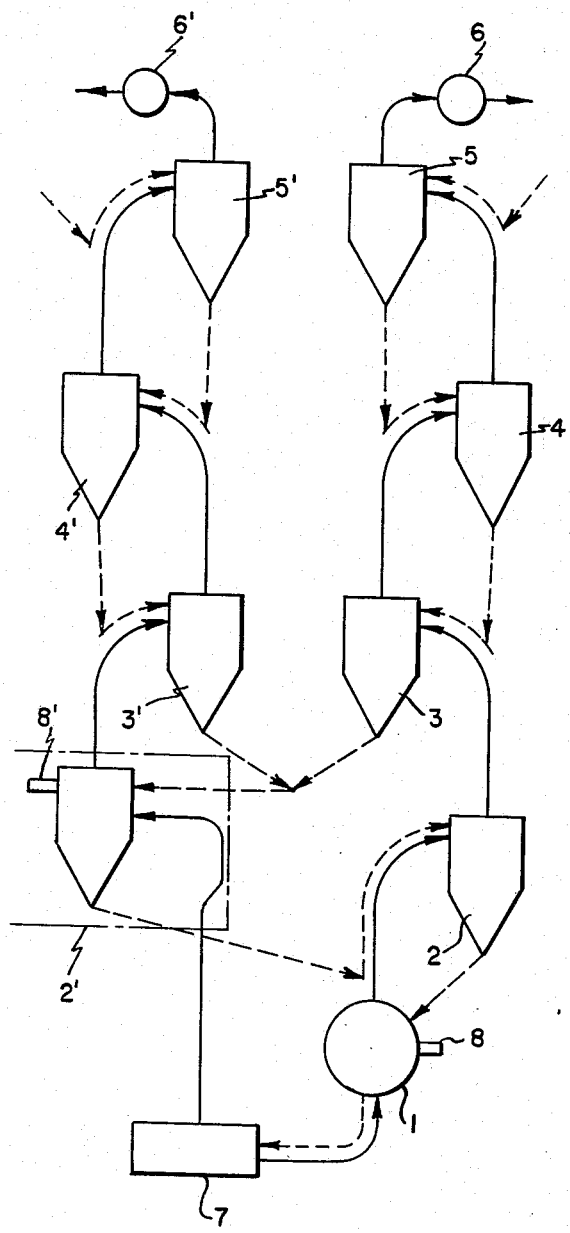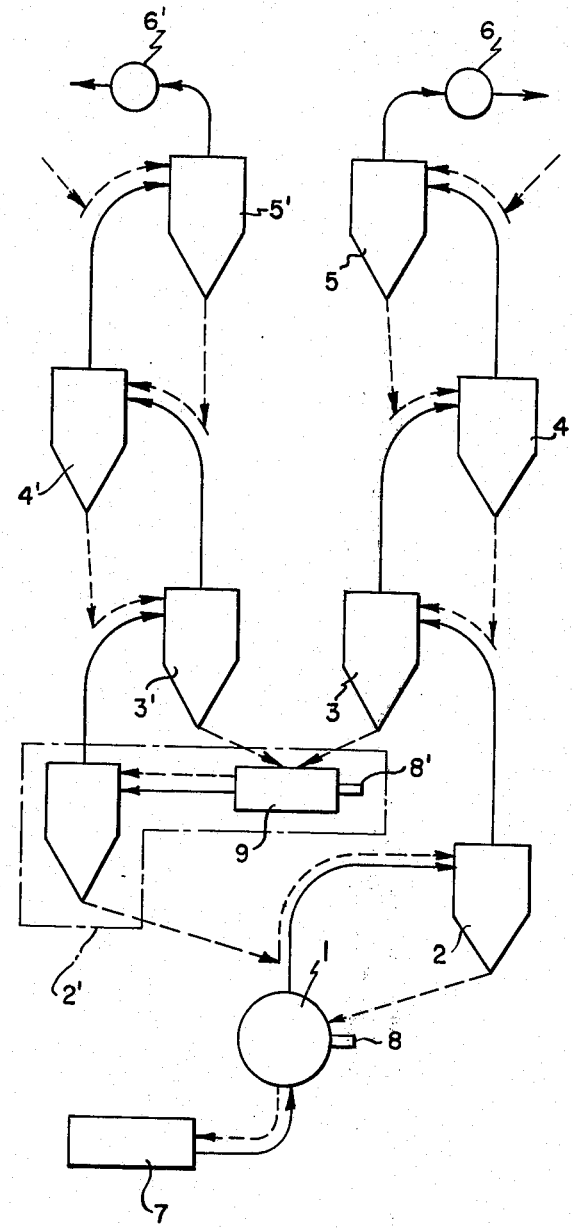

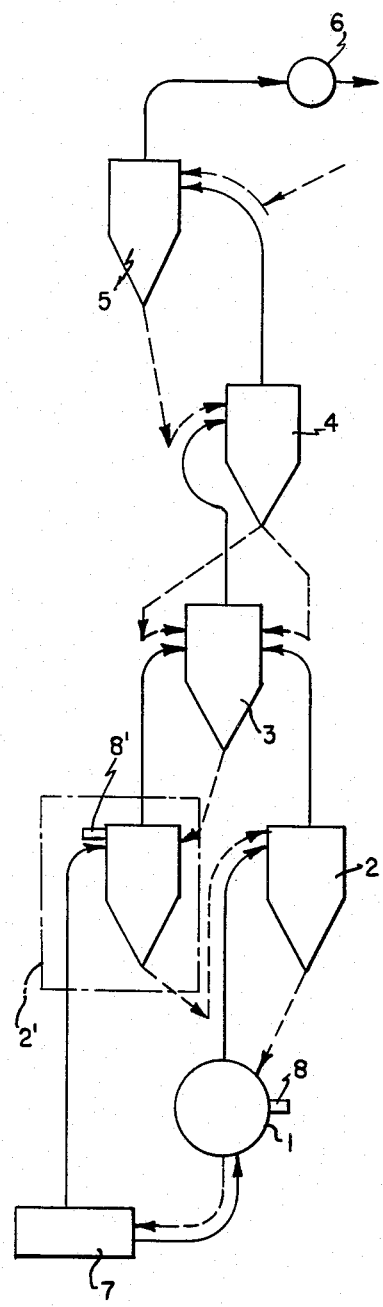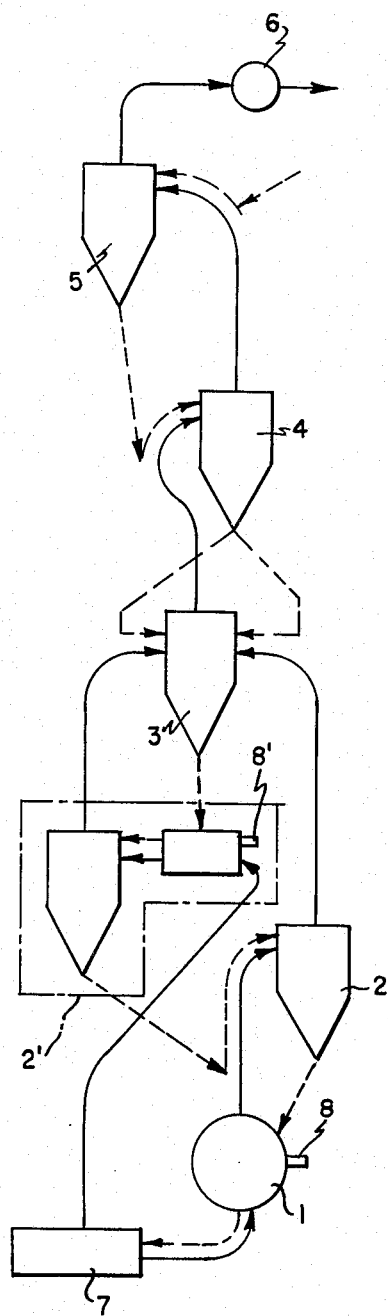

SUSPENSION-TYPE PREHEATING SYSTEM FOR POWDERY RAW MATERIALS

The present invention relates generally to a suspension-type preheating device for powdery raw materials of which system comprises a plurality of preheating devices.

The procedure for the burning (or sintering) of powdery raw materials such as those materials for use in cement clinker production is roughly divided into preheating, calcining (decarbonation of the raw materials), burning and cooling zones in the order of the raw materials flow. In such a case it has been known that since a large amount of heat is consumed in the calcining zone for the endothermic reaction, the temperature difference between gas and raw materials becomes smallest at the raw material inlet of the calcining zone. in an attempt to improve heat transfer at the raw material inlet of the calcining zone has been suggested a suspension-type burning process hereinafter reffered to as "SP process") in which a so called suspension-type preheating device (hereinafter reffered to as "SP device") where heat transfer is conducted with the raw materials being suspended in gas, is provided on the end side of a burning furnace, thus effecting the preheating and partial calcining of the raw materials with the exhaust gas from said furnace. The SP process has the merits that the overall thermal efficiency of the burning process is improved and that the burning furnace, normally a rotary kiln but not limited hereto, can be rendered smaller. However when the temperature of the exhaust gas from the furnace exceeds 1200°C, as is known in the art, valatile matters such as alkali, chlorine and sulfer introduced in the system with the raw materials and/or fuel, which is mostly evaporated in the furnace and carried with the furnace gas, will be condensed and accumulated on the materials or wall in the higher temperature portion of the SP device to form large quantities of coating or to lower the fluidity of the raw materials thus causing troubles upon operation. As a consequence of such limitations as to the temperature of exhaust gas from the burning furnace, only preheating and approximately 50% calcining of the raw materials are effected in the SP device and the remainder of the calcining reaction must be done in the burning furnace. Therefore the burning furnace has to be made two times volume as compared with the case that it plays a role of burning (or sintering reaction of raw materials and this fact has been a hindrance to realize a large production unit.

In an attempt to conquer the disadvantages of the SP device of the type described above has been deviced a process (hereinafter reffered to as "SCP process") as well as facilities therefor wherein a supplementary burner (or burners) is provided in the lowest heat transfer stage (in other words the heat transfer stage of the preheater nearest to the burning furnace). By this preheating device (hereinafter reffered to as "SCP devices"), the raw materials suspended in gas are almost completely calcined instantaneously with the exhaust gas from the burning furnace as well as with the combustion gas obtained by firing fuel with hot combustion air led from a cooler after having been used for cooling the burned product (or clinker).

It is a remarkable advantage of the SCP process that the volume of the furnace can be diminished less than one half of that required for the conventional SP process, since almost completely calcined materials are fed into the burning furnace so that it takes a part of burning (or sintering) reaction only.

In the SCP device, however, the more calcination reaction of the raw materials proceeds, the higher partial pressure of carbon oxides in gas becomes and therefore the more speed of the calcining reaction is retarded. As a consequence, raw materials of which temperatures are lower than about 900°C could not substantially complete said reaction instantaneously. In addition, in SCP device, the fuel is fired with the mixture of air and the exhaust gas from the burning furnace and therefore under the atmosphere of a lower oxygen partial pressure than air, so that it was difficult to effect the combustion completely unless the excess air ratio is made considerably higher as compared to that in the burner in the burning furnace.

As is apparent from the foregoing, at the material inlet of the calcining zone the gas temperature of this device becomes 50° - 100°C higher and also gas volume at the point becomes also higher than the conventional SP device. A credit of a low heat loss of the SCP process due to a small burning furnace is consumed by the deteriorated thermal efficiency of the preheater and as a consequence the overall thermal efficiency of the burning process will hardly be improved by this process.

As in the burner for the burning furnace, the combustion air for the supplementary burner is in general hot air resulting from heat transfer of the burned product (or clinker) in the cooler, but in no way limited thereto.

In using the combustion air from the cooler the draught resistance in the air duct running from the cooler to the air inlet in the lowest stage of the preheating device is in general higher than that in the burning furnace, so that in order to lead adequate combustion air to the preheating device, it is required for a throttle to be provided in the furnace exhaust gas duct connecting the burning furnace to the lowest stage of the preheater. However, this throttle will be provided where coating due to alkali condensation as described above will build up heavily, thus frequently causing troubles upon operation and making it difficult to control the flow rate of furnace exhaust gas and combustion air. Moreover it is indispensable that unnecessary power loss is braught by the throttle.

The present invention has been made as a result of our extensive research aiming at elimination of the above described faults or defects attendant on conventional preheating devices and also at provision of a commercially profittable suspension-type preheating device for powdery raw materials. Thus the present invention provides the most reasonable suspension-type burning process for powdery raw materials of which preheating device is directly combined with a burning furnace such as a rotary kiln. More particularly the present invention provides such a suspension-type preheating device that comprises a preheating-with-exhaust-gas device where in heat transfer between the powdery raw materials and the exhaust gas from the burning furnace is effected in a plurality of stages and a preheating-with-combustion-gas device arranged in parallel with said preheating-with-exhaust-gas preheating device, where in heat transfer between the powdery raw materials and the combustion gas generated in the lowest stage is effected in a plurality of stages.

The present invention further provides a suspension-type preheating device which is so arranged that the material streams each having flowed down through the respective heat transfer devices pass finally through the lowest stages of both heat transfer devices in series.

In the preheating-with-combustion-gas device, a supplementary burner (or burners) is provided in the lowest heat transfer stage to fire fuel thus generating combustion gas. The combustion air is in general heated air as a result of heat exchange in a cooler with the burned product (or clinker), but in no way limited thereto. In this device only the combustion air is fed to the lowest heat transfer stage so that the combustion can be effected with the lowest possible excess air such as c.a. 10% and as the result the gas volume leaving the calcining zone can be minimized. Moreover, as calcination reaction takes place in gas with a low carbon oxides partial pressure, it thus becomes possible to rapidly and easily complete the calcining reaction at relatively law material temperature such as in the range of from 800° to 850°C. As a consequence the gas temperature at the material inlet of the calcining zone becomes 50° – 100°C lower than that in said SCP device.

As is apparent from the foregoing, the exhaust gas temperature at the exit of the final, i.e. the uppermost, heat transfer stage will be lower than any conventional suspension-type preheating devices. Furthermore, in comparison to the conventional SCP device where both the combustion air from the cooler and the exhaust gas from the burning furnace are employed, facilities for the lowest heat transfer stages where the supplementary burner is installed can be made smaller in this preheating device. As a matter of course, it is also possible to introduce into the lowest heat transfer stage those combustion gases generated by effecting combustion of said fuel in some other devices.

Furthermore, when the preheating device is so arranged that the raw materials in each devices, i.e. the preheating-with-combustion-gas device and the preheating-with-exhaust-gas device, pass through the last stage of both devices in series, the materials may be calcined more perfectly before being fed to the burning furnace. Thus the volume of said furnace can be diminished further and overall thermal efficiency of the present invention will be significant as compared with any conventional device.

Moreover, in the preheating device in accordance with the present invention, the raw material inlets of the respective preheating devices are provided independently of each other and therefore it is possible to control at will the heat and/or pressure balance between the two devices by means of charging the raw materials in the corresponding amounts to the gas flow in the respective devices.

In addition, according to the preheating device of the present invention, it is also possible to make adjustment of the excess air for the combustion of the burner for the burning furnace and the supplementary burner for the preheater in accordance with the amount of combustion in the respective burners. For this purpose the two heat transfer devices, the heat transfer stages situated downstream are arranged in parallel and induced by independent fans. Therefore it becomes unnecessary to install a throttle or the like so as to compensate lower draught resistance of the burning furnace than that of the air duct through which the hot combustion air is introduced from the cooler to the heat transfer stage provided with a supplementary burner, and as a consequence pressure loss of the exhaust gas from the burning furnace due to the throttle can be saved.

It is a remarkable advantage of the present invention that augmentation of the capacity of existing burning furnaces combined with conventional SP devices can be easily achieved by arranging a separate preheating device, provided with a supplementary burner in the lowest heat transfer stage.

In the present invention, the number of the heat transfer stages are in no way limited, although four stages is the most economical from standpoints of thermal efficiency and pressure loss. Furthermore, with regard to the preheating device itself, a plurality of such systems may be employed if desired or necessary.

The preheating device according to the present invention will be further described with reference to the attached drawing while comparing to conventional preheating devices.

FIG. 1 is a flow sheet of a conventional suspension-type four-stage preheating (SP) device.

FIG. 2 is a flow sheet of a known SCP device where the heat transfer stage nearest to the burning furnace comprises a calcining furnace consisting of a cyclone provided with a supplementary burner (the calcining furnace hereinafter referred to as "cyclone type calcining furnace"), in which combustion of fuel supplied and calcination of the raw materials flowed down from the upper stage are effected by a circling flow formed by the mixture of the hot combustion air led from a cooler after having been used for cooling the burned product (or clinker) and the exhaust gas from the burning furnace.

FIG. 3 is a flow sheet of a known SCP device where the heat transfer stage nearest to the burning furnace comprises a different type calcining furnace from that shown in FIG. 2 (the calcining furnace hereinafter referred to as "air current type calcining furnace"), said air current type calcining furnace being a device provided with a supplementary burner in which both combustion of fuel and calcination of the raw material are effected by a turbulent flow formed by the mixture of hot combustion air from the cooler and exaust gas from the burning furnace.

FIGS. 4 and 5 are flow sheets of representative embodiments of this invention those shown in FIG. 4 in that the flow of the raw materials becomes serial in the heat transfer stage nearest to the burning furnace. FIGS. 6 and 7 each depicts a binary preheating device, FIG. 6 shows a device where the cyclone type calcining furnace is employed for the heat transfer stage nearest to the burning furnace in the preheating-with-combustion-gas device and FIG. 7 shows a device where the air current type calcining furnace is employed for the heat transfer stage nearest to the burning furnace in the preheating-with-combustion-gas device.

In these figures, each of the heat transfer stages each consists of a combination of duct and cyclone, duct and calcining furnace, or duct, cyclone and calcining furnace. The number of the stages is four and the respective stages will be referred to as 4th, 3rd, 2nd and 1st stages in the order of nearer location to the burning furnace. For convenience, the heat transfer stage consisting of cyclone and duct will be expressed using the number given to the cyclone.

Referring now more specifically to FIG. 1 showing a conventional SP device, the exhaust gas, which is created by the combustion of fuel through a burner (or burners) 8 of a burning furnace 1 with hot combustion air (secondary air) led from a cooler 7 after having been used for cooling the burned product (or clinker), flows from the burning furnace 1 through 4th heat transfer stage 2, 3rd heat transfer stage 3, 2nd heat transfer stage 4 and then 1st heat transfer stage 1 to an exhaust blower 6 where the gas is discharged from the device. On the other hand, the powdery raw materials are charged at a point A, i.e. somewhere in a duct of the 1st heat transfer stage 5 and then flow down through the 1st heat transfer stage 5, the 2nd heat transfer stage 4, the 3rd heat transfer stage 3 and then the 4th heat transfer stage 2, while being preheated and partially calcined by heat exchange in the respective heat transfer stages with the exhaust gas. The materials then enter into the burning furnace 1, and is burned to clinker there, whereafter it is cooled in the cooler 7.

FIG. 2 shows a preheating device which is the same as that shown in FIG. 1 except in that a cyclone type calcining furnace which is provided with a supplementary burner 8' is used as 4th heat transfer stage 2. In this device both exhaust gas from a burning furnace 1 and combustion air from a cooler 7 are introduced into the 4th heat transfer stage 2 and the path of the gas and raw materials is known in the art, as that in the preheating device shown in FIG. 1.

FIG. 3 shows a known preheating device where an air current type calcining furnace 9 provided with a supplementary burner 8' and a cyclone are employed as 4th heat transfer stage 2. In this preheating device, both exhaust gas from a burning furnace 1 and hot combustion air are introduced into the calcining furnace 9 and then pass through the cyclone while the raw materials also carried over the calcining furnace together with the gas to the cyclone, where the materials are separated from the gas and then sent to the burning furnace 1. FIG. 4 shows an embodiment of the preheating device in accordance with the present invention where exhaust gas from a burning furnace 1 flows up through an exhaust-gas heat-transfer device consisting of 4th, 3rd, 2nd and 1st heat transfer stages, 2, 3, 4 and 5, respectively, and discharged by an exhaust blower 6. In parallel with this device is arranged 4th heat transfer stage provided with a cyclone type calcining furnace, where fuel is fired by a supplementary burner 8' with hot combustion air introduced from a cooler 7 and heat transfer is effected between the combustion gas and the raw materials suspended therein, as well as a combustion-gas-heat transfer device connected in series with the 4th stage consisting of 3rd, 2nd and 1st heat transfer stages, 3', 4' and 5', respectively. Through the combustion-gas-heat device the hot gas flows up and discharged by an exhaust blower 6'. On the other hand, the powdery raw materials are introduced independently into the 1st stages 5 and 5' of the respective devices and flow down through the 2nd, and 3rd stages, 4 and 4', and 3 and 3', respectively.

Both of the raw material streams each heated in the respective heat transfer devices arranged in parallel up to the 3rd stages are introduced into the 4th stage 2' of the preheating-with-combustion-gas device, where it is calcined by combustion in the supplementary burner 8'. If operation is so made as to maintain the gas temperature at the exit of the 4th stage 2' at 800° – 830°C, the raw materials will be calcined 70 – 75%. Furthermore, the raw materials introduced into the 4th stage 2 of the preheating-with-exhaust-gas will be calcined completely with the exhaust gas from the furnace 1 at 1100° – 1200°C, and then fed into the furnace 1. Since the raw material is calcined in the 4th stage 2 under atmosphere with low carbone oxides partial pressure, the gas temperature at the exit of this stage will be approximately 850°C.

As will be seen from the foregoing, the gas temperature (800° – 850°C) at the exits of the 4th stages 2 and 2', where the calcining reaction in the preheating device of FIG. 4 is effected, is lower than that in the preheating device of FIGS. 2 and 3, thus improving the overall thermal efficiency of the burning process.

FIG. 5 shows another embodiment of the present invention where an air current type calcining furnace 9 and a cyclone are used as 4th heat transfer stage of the preheating-with-combustion-gas device. In this embodiment, the preheating-with-exhaust-gas is of the same type and function as that shown in FIG. 6. While, in the preheating-with-combustion-gas device including a calcining furnace 9 provided with a supplementary burner 8' is also the same type and function as that in FIG. 4 except that hot combustion air from a cooler 7 is introduced into the calcining furnace 9 for combustion of the burner 8', and the generated combustion gas, after calcining the raw materials comming from the 3rd stages 3 and 3' is introduced together with the raw materials into the cyclone where raw materials are separated and sent to 4th stage 2 while clean gas is sent to upper stage 3'.

In the preheating devices of FIGS. 4 and 5, almost the same results will be obtainable as the raw materials flow in series from the 4th stage 2 in the preheating-with-exhaust-gas device to the 4th stage 2' in the preheating-with-combustion-gas device and then enters the burning furnace 1.

In addition, heat transfer in the heat transfer stages between the raw materials and hot gas may be effected by either counter-flow type or uni-flow type. Furthermore, it is understood that the heat transfer stages of the preheating device according to the present invention can be applied not only to those preheating devices of the type using cyclones as shown in FIGS. 4 and 5, but also to those preheating devices of the type effecting heat transfer and the powdery raw materials suspended in a swirled or vortex stream. Moreover, although in the respective Figures has been explained the calcining furnace using as representative examples thereof two types, i.e. cyclone type and air current type, of calcining furnaces, it is understood that in the present invention both the type and structure of the calcining furnace are critical and any type and structure thereof will do if it is provided with a furnace capable of generating combustion gas independently of the burning furnace.

As will be clear from the foregoing, the preheating device according to the present invention consists essentially of a preheating-with-exhaust-gas device where as a medium for preheating the powdery raw materials is used only hot exhaust gas from a burning furnace and a preheating-with-combustion-gas device, arranged in parallel with said preheating-with-exhaust-gas device, where only combustion gas separately generated is used as the medium, wherein the raw material streams each having flowed down through the respective heat transfer devices up to 3rd stages pass finally through the 4th stage of the respective heat transfer devices nearest to the burning furnace in series and then enter into the furnace. According to the device of the present invention, calcination of the raw materials with the lowest possible material temperature are substantially completed, thus making it possible to render the overall size of the burning furnace smaller, overall thermal efficiency can be significantly improved.

Furthermore, the amount of fuel consumed in the burner 8 and the supplementary burner 8' can be so controlled at will as to optimize the burning conditions, and their combustion conditions of both of the burners (i.e., excess air ratio of combustion) are freely controlled by means of the exhaust blowers of respective heat transfer device so that operation can be facilitated and power consumption can be minimized. These all means a great superiority of the present device over any conventional system.

What is claimed is:

1. A suspension type pre-heating system for powdery raw materials comprising a pre-heating-with-exhaust-gas system including a furnace transmitting exhaust gas and also including a plurality of heat transfer devices for effecting heat exchange between powdery raw materials and said exhaust gas, and a pre-heating-with-combustion-gas system arranged in parallel with the first named system and including a calcining furnace transmitting combustion gas and also including a plurality of heat transfer devices for effecting heat exchange between powdery raw materials and said combustion gas, the heat transfer devices of the first named system being arranged in series from an upper device to a lower device, and the devices being connected by a duct system for the powdery raw materials so that the latter may be gradually heated while flowing from an upper device to a lower device, the pre-heating-with-combustion-gas system including a plurality of heat transfer devices for effecting heat exchange between powdery raw materials and said combustion gas, the latter heat transfer devices being arranged in series from an upper device to a lower device, and said latter devices being connected by a duct system for the powdery raw materials so that the latter may be gradually heated while flowing from an upper device to a lower device, means for connecting a lower device of the pre-heating-with-exhaust-gas system and a lower device of the pre-heating-with-combustion-gas system for combining the pre-heated materials, means for conducting the combined pre-heated powdery raw materials to said calcining furnace, means for conducting said materials from said calcining furnace to the lower-most device of said first named system and means connecting said last named device with said furnace.

2. A system as set forth in claim 1 wherein the upper device of each pre-heating system is supplied with powdery raw material and an exhaust blower is connected with each of the upper devices.

* * * * *